United States Patent [19]

Sheen

[11] Patent Number: 5,044,985

[45] Date of Patent: Sep. 3, 1991

[54] TYPE OF FIXED SLEEVE FOR A CIGARETTE LIGHTER SEAT

[76] Inventor: Light Sheen, No. 37, Lane 25, Ching Li Street, Tu Chen Hsiang, Taipei, Taiwan

[21] Appl. No.: 469,666

[22] Filed: Jan. 24, 1990

[51] Int. Cl.⁵ .......................................... H01R 13/74
[52] U.S. Cl. .................................. 439/544; 248/27.3; 439/555
[58] Field of Search ............... 439/544, 555; 248/27.3

[56] References Cited

U.S. PATENT DOCUMENTS

| | | | |
|---|---|---|---|
| 3,285,548 | 11/1966 | Matto et al. | 439/555 X |
| 3,697,025 | 10/1972 | Edwards | 439/555 X |
| 3,852,513 | 12/1974 | Flahive | 439/544 X |
| 4,211,905 | 7/1980 | Quigley | 248/27.3 X |
| 4,577,818 | 3/1986 | Clarisse | 439/544 X |

Primary Examiner—Eugene F. Desmond
Attorney, Agent, or Firm—Armstrong, Nikaido, Marmelstein, Kubovcik & Murray

[57] ABSTRACT

An improved type of fixed sleeve for an automobile cigarette lighter seat, having an improved structure which changes the fixed distance of installation to match the panel board thickness of various models of motor vehicles. The cigarette lighter seat will thus be firmly installed on the panel board of virtually any model of motor vehicle. The installation of an automobile power socket or cigarette lighter element is then possible through this improved installation of a cigarette lighter seat.

4 Claims, 5 Drawing Sheets

FIG. 2
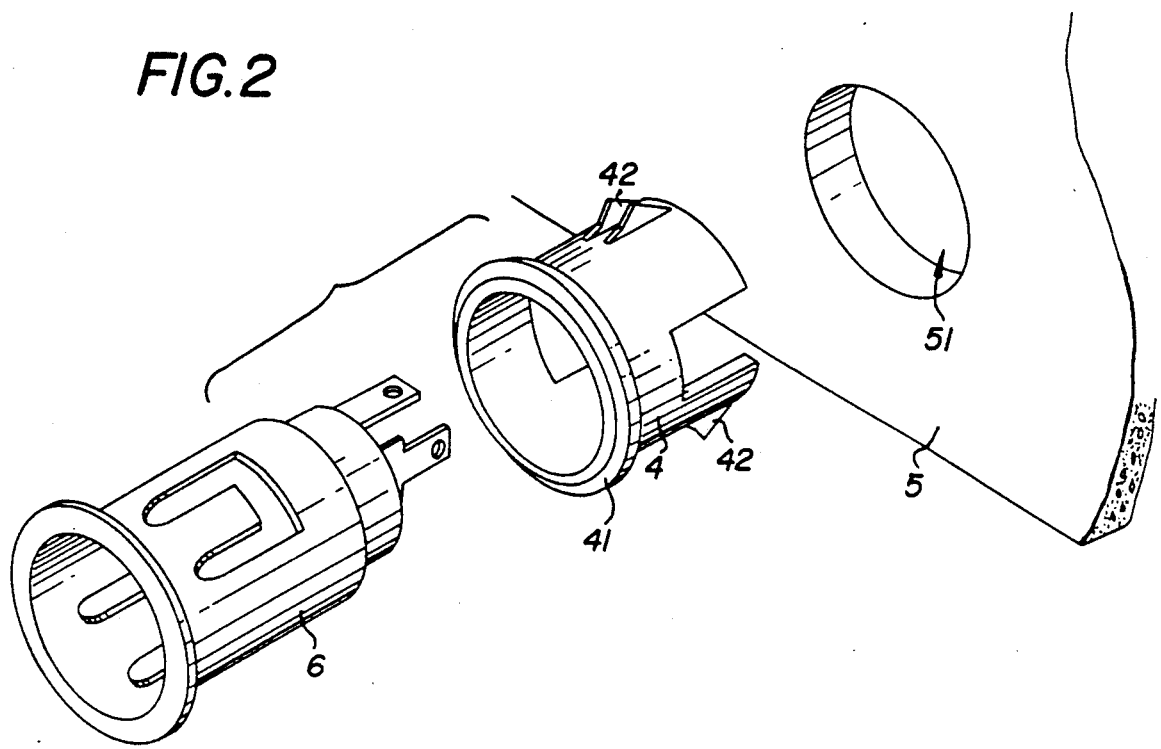
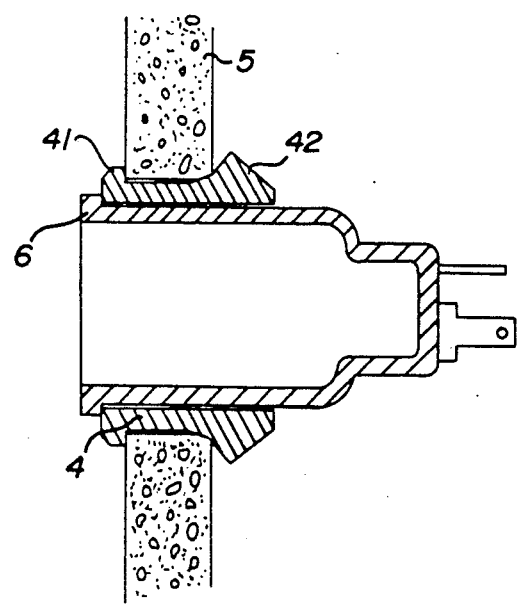
FIG. 2A
PRIOR ART

FIG. 3
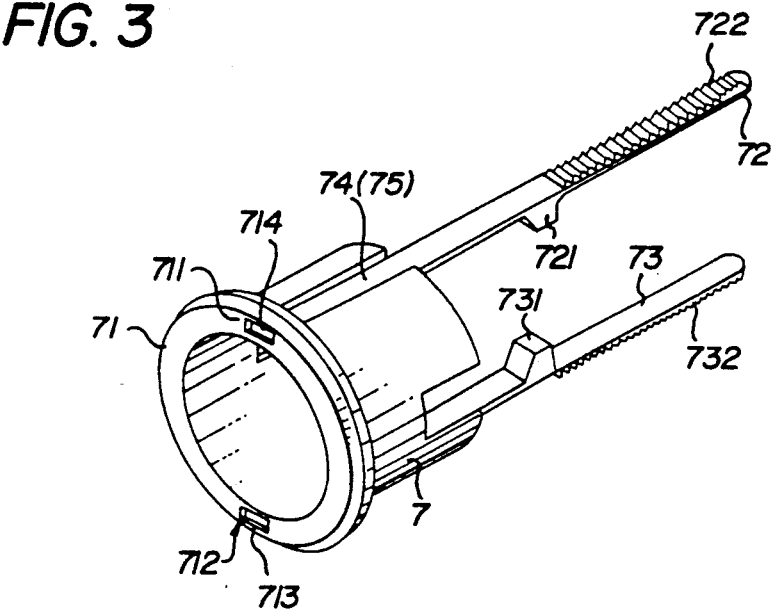
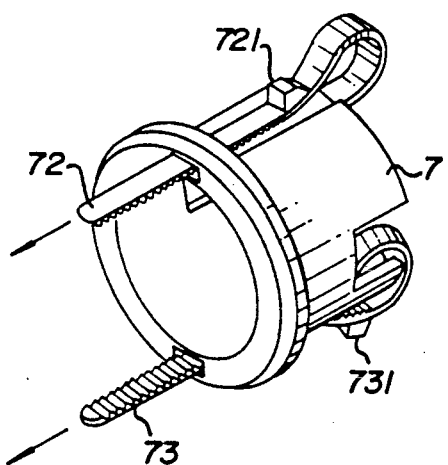
FIG. 3a

TYPE OF FIXED SLEEVE FOR A CIGARETTE LIGHTER SEAT

BRIEF SUMMARY OF THE INVENTION

The interior design of older motor vehicles had less emphasis on beauty then today's cars. Typically, the lower half of the front panel board face plate, or dashboard, was of a semi-opening design to facilitate installation of auxiliary wiring and piping for air conditioners, heaters, as well as various electronic units.

Today's motor vehicles have more aesthetic interiors, with an increased emphasis on compactness and integration. Cigarette lighters are a popular accessory for motor vehicle interiors. This invention is directed to a method of integrating a cigarette lighter seat into a dashboard, in an efficient, cost-effective manner.

BRIEF DESCRIPTION OF THE DRAWINGS

FIG. 2 shows a second known method of installing a cigarette lighter seat onto a face plate.

FIG. 2a is a cross-sectional view of the installation of FIG. 2.

FIG. 3 shows one embodiment of the present invention.

FIG. 3a shows the invention of FIG. 3 preparatory to clamping a panel.

DETAILED DESCRIPTION OF THE INVENTION

Figure 1:
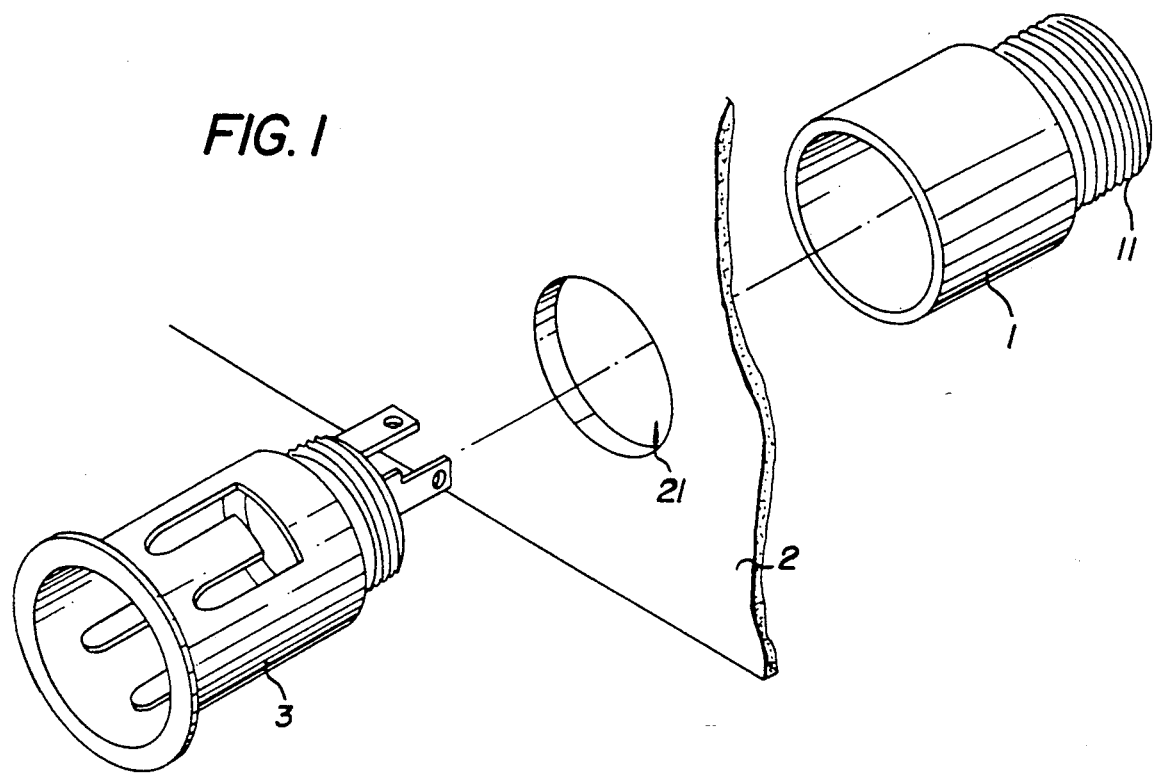
FIG. 1 shows a known method of installing a cigarette lighter seat onto a face plate.
Figure 1A:
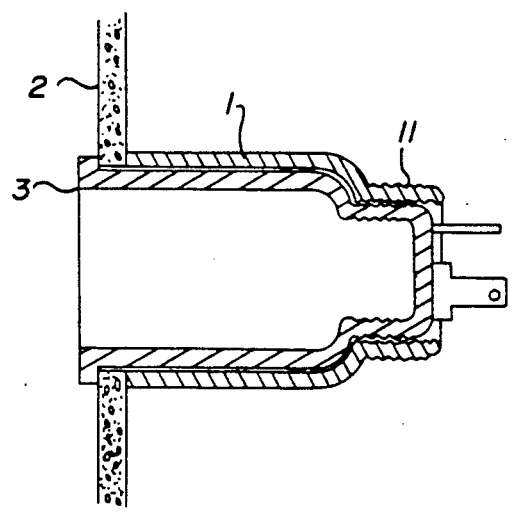
FIG. 1a is a cross-sectional view of the installation of FIG. 1.

As shown in FIG. 1, in the installation of a cigarette lighter a sleeve 1 with threads 11 is first placed into the rear side of the face plate 2. Then cigarette lighter seat 3 is passed through the front side of the face plate 2 and further passes through a circular hole 21 and locked with the screw bolt of sleeve 1, and thus the installation of an automobile cigarette lighter seat was accomplished. This type of cigarette lighter could also be joined to the panel board by screws. Independent of the thickness of the panel board, the cigarette lighter seat can be firmly installed. However, since the installation and fabrication of the various parts is complicated, the production cost is usually high.

More attention is paid to the beautiful appearance of the interiors of motor vehicles which are built in recent years. The face plates of the panel boards of these motor vehicles are usually of a compact, integrated design. The cigarette lighter installation in such an automobile is illustrated in FIG. 2, wherein the fixed sleeve 4 of the cigarette lighter seat is placed through circular hole 51 of face plate 5 and, by means of the gap existing in between the front edge 41 of the fixed sleeve 4 and the inserting stud seat 42, the face plate 5 can be firmly engaged therebetween, completing the installation of the sleeve. Then the cigarette lighter seat 6 is placed into the opening of fixed sleeve 4 such that the components become interlocked, thereby installing the seat within the sleeve. To allow this system to work with the different panel types of different motor vehicles, fixed sleeves of various thicknesses are produced. The distance between the front edge 41 of the fixed sleeve 4 and the inserting stud seat 42 will vary depending on the thickness of the panel board face plate 5. This requirement necessitates the manufacture and availability of a multiplicity of fixed sleeve products which vary in their fixed distances. Although it seems to be a simplified installation, it is not regarded as a practical method for mass production in today's automotive industry.

In view of the above-mentioned deficiencies, research was begun to develop an improved type of fixed sleeve for a cigarette lighter seat for motor vehicles. After years of repeated experiment and continuous research and development, the present invention was made. The invention was not only found to be capable of being installed on the panel boards of various types of motor vehicles, but can also be arranged for mass production, which results in significant cost savings and provides manufacturing flexibility which is essential in the automotive industry.

Referring to FIG. 3, it can be seen that the primary structural improvement of this invention exists in having two holes 711 and 712 set on the front edge of the fixed sleeve 7 of the cigarette lighter seat, with inverted hooking rows 713 and 714 installed in the interior of the aforementioned holes 711 and 712; and two pieces of tight shrinkage pulling strips 72 and 73 are also set at the extreme end of the fixed sleeve 7, corresponding to holes 711 and 712 Also set on the pulling strips 72 and 73 are inserting stud seats 721 and 731, on which sawtooth shaped grooves 722 and 732 are formed; on the circumferential wall of the fixed sleeve 7 are two concave grooves 74 and 75, to accommodate the pulling strips 72 and 73.

Figure 4:
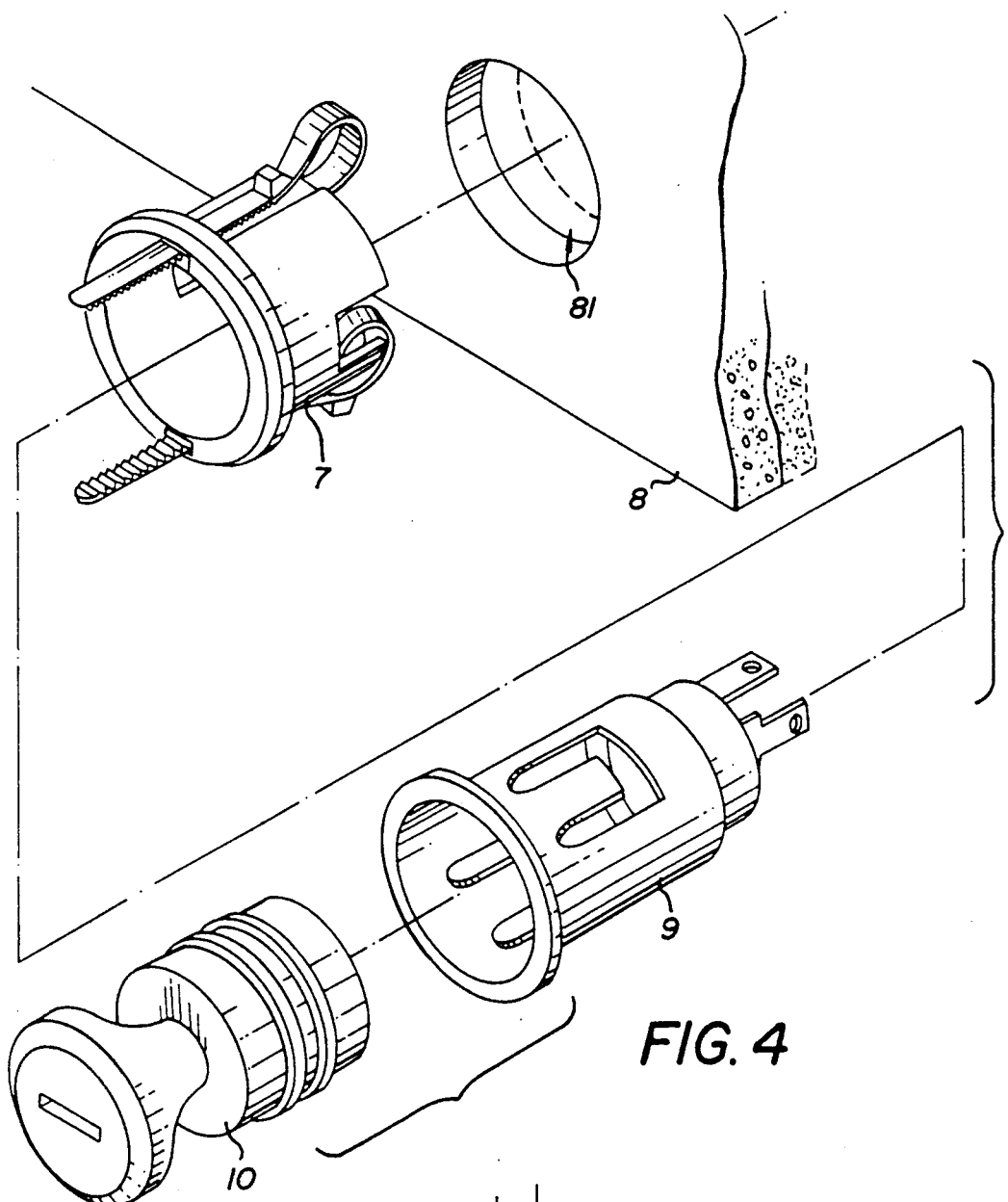
FIG. 4 shows a method of installing this embodiment onto a face plate.
Figure 4A:
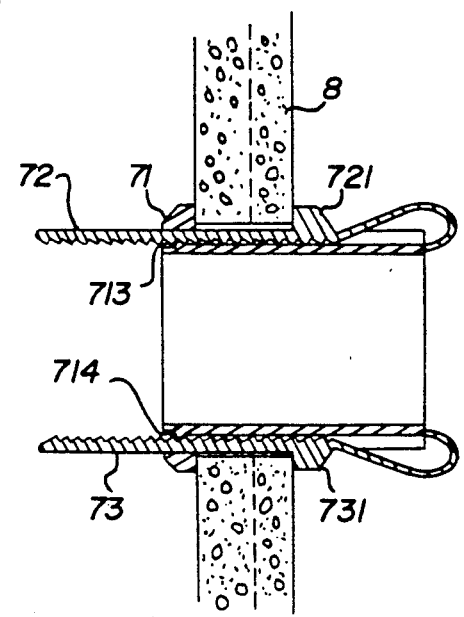
FIG. 4a is a cross-sectional view of the installation of FIG. 4.

As shown in FIG. 4, when this invention is being mounted to the face plate, the extreme end of the pulling strips 72 and 73 are placed in an inverted manner into the holes 711 and 712 of the front edge 71. This assembly is then placed into circular hole 81 of face plate 8. The front edge 71 of fixed sleeve 7 will be located at the front direction of the face plate 8, preventing sleeve 7 from passing all the way through hole 81, while inserting stud seats 721 and 731 will be located at the rear side of the face plate 8. When the pulling strips 72 and 73 are pulled forward, the inserting stud seats 721 and 731 will be moved forward toward the direction of the face plate 8. Face plate 8 will then become squeezed between front edge 71 and stud seats 721 and 731, thereby firmly securing sleeve 7. Then, the unnecessary protruding portions of pulling strips 72 and 73 are removed by cutting or a similar process, leaving the outer surface in a finished, smooth condition.

When pulling strips 72 and 73 are moved forward in the interior of holes 711 and 712 of the front edge 71, tooth grooves 722 and 732 of the pulling strips 72 and 73 are in a forward direction and contact with inverted hooking tooth rows 713 and 714 which are located in the interior of holes 711 and 712. The pulling strips are disposed to allow them to be pulled as far as necessary to allow the sleeve to be securely fastened to the face plate. When pulling strips 72 and 73 are pulled in a withdrawing direction, tooth grooves 722 and 732 and the inverted hooking tooth rows 713 and 714 will be interlocked to prevent movement in the plane of the imaginary line of FIG. 4. The pulling strips 72 and 73 and the holes 711 and 712 of fixed sleeve 7 will be tightly fixed by interlocking with each other on the fixed plate 8, making their withdrawal impossible.

After the above-mentioned processes are completed, cigarette lighter seat 9 is placed into fixed sleeve 7. A cigarette lighter element can be placed in the cigarette lighter seat 9 and thus form a cigarette lighter device.

The essential features of this invention exist in pulling strips 72 and 73 and their being moved forward in the interior of holes 711 and 712 of the front edge 71, driving inserting stud seats 721 and 731 forward to gradually diminish the distance between the front edge and the stud seats. Because of this feature, this invention is applicable for installation on the face plate of panel boards of various thickness in different brands and models of motor vehicles. In addition, this invention can also be applicable in the installation of wire sleeve or tube sleeve piping of cable and wire or plastic tubes, in which the piping will have to be passed through a plate made of wood or other materials, to prevent damage to the piping and to the plates.

Figure 5:
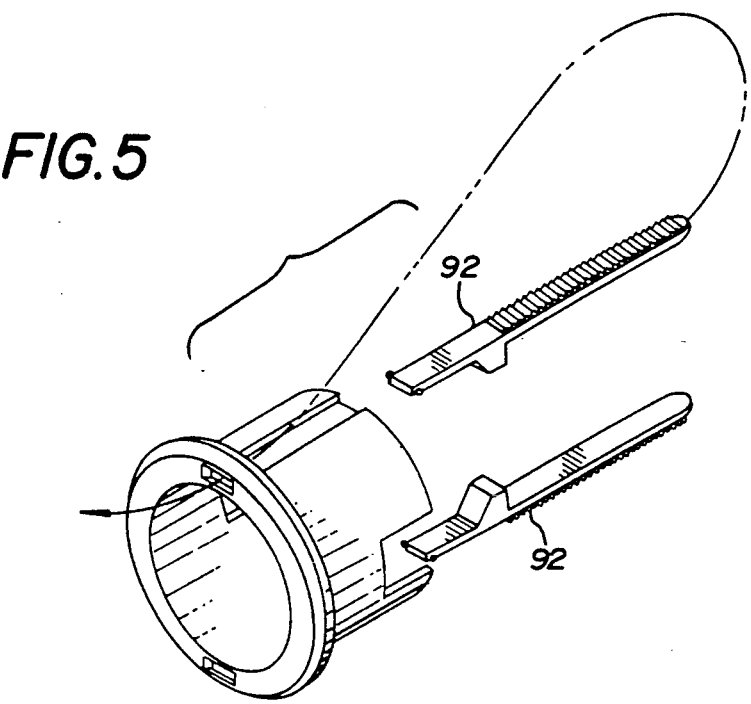
FIG. 5 and 5a show second and third embodiments of the claimed invention.
Figure 5A:
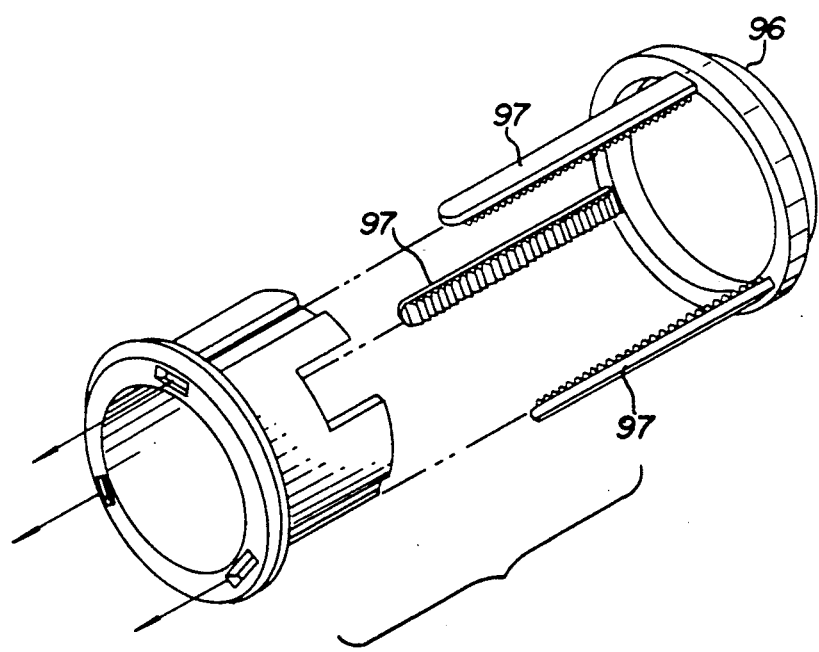

In a second embodiment of this invention, a movable type of pulling strip 92 can also be adopted as shown in FIG. 5, or having the application of an annular inserting stud ring 96 in coordination with two or three pulling strips 97, which will be interlocked for fixed engagement at the front edge of the sleeve. However, as such an application falls within the scope of this invention, it is being regarded as described under the claims of this invention.

The advantages of this invention are set as follows:

1. Can be installed on the face plates of panel boards of virtually any thickness, on virtually any brand or model of motor vehicle.
2. Can be rapidly, firmly, conveniently and efficiently installed.
3. Capable of reducing the cost of production and meeting with the requirements increasing manufacturing efficiency.

Summarizing the above-mentioned description, it can be concluded that this invention provides an improved type of automobile cigarette lighter seat which is not only advantageous due to its simplified structure, but it can be fabricated for mass production at a greatly reduced cost.

It is readily apparent that the above-described invention has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

I claim:

1. A fixed sleeve for an automobile cigarette lighter, comprising:
   a sleeve having a front edge, with two holes located therein;
   at least one hooking tooth row set in the interior of each of said holes;
   at least two pulling strips having at least two sides disposed along said sleeve;
   tooth grooves formed in one side of each pulling strip, said tooth groove being disposed to engage said hooking tooth rows when the pulling strips are pulled through said holes.

2. A fixed sleeve for an automobile cigarette lighter recited in claim 1, wherein said holes on said front edge of the sleeve are rectangular.

3. A fixed sleeve for an automobile cigarette lighter as recited in claim 1, wherein said pulling strips include stud seats disposed to clampingly engage a plate together with said front edge, when said tooth grooves are engaged with said hooking tooth rows.

4. A fixed sleeve for an automobile cigarette lighter as recited in claim 2, wherein said pulling strips include stud seats disposed to clampingly engage a plate together with said front edge, when said tooth grooves are engaged with said hooking tooth rows.

* * * * *